United States Patent [19]

Kennard

[11] Patent Number: 5,081,649
[45] Date of Patent: * Jan. 14, 1992

[54] METHOD OF QUADRATURE-PHASE AMPLITUDE MODULATION

[75] Inventor: Paul A. Kennard, Nepean, Canada

[73] Assignee: Northern Telecom Limited, Montreal, Canada

[*] Notice: The portion of the term of this patent subsequent to Aug. 8, 2006 has been disclaimed.

[21] Appl. No.: 359,917

[22] Filed: Jun. 1, 1989

[51] Int. Cl.$^5$ .............................................. H04L 5/12
[52] U.S. Cl. ........................................ 375/39; 375/42; 332/103
[58] Field of Search ................. 332/103, 151; 329/304; 371/43; 375/39, 42

[56] References Cited

U.S. PATENT DOCUMENTS

| | | | |
|---|---|---|---|
| 4,586,182 | 4/1986 | Gallager | 371/43 |
| 4,627,077 | 12/1986 | Armstrong | 375/39 |
| 4,675,619 | 6/1987 | Uchibori et al. | 332/151 |
| 4,750,191 | 6/1988 | Yoshida | 332/104 |
| 4,855,692 | 8/0889 | Kennard et al. | 375/39 |

OTHER PUBLICATIONS

"Digital Amplitude-Phase Keying with M-ary Alphabets", by C. Melvil Thomas et al., 1972 International Telemetry Conference, Los Angeles, Calif., IEEE Transactions on Communications, Feb. 1974, pp. 168-179.

"Odd-Bit Quadrature Amplitude-Shift Keying", by Joel G. Smith, 1974 International Telemetering Conference, Los Angeles, Calif., IEEE Transactions on Communications, Mar. 1975.

Primary Examiner—Benedict V. Safourek
Assistant Examiner—Young Tse
Attorney, Agent, or Firm—R. John Haley

[57] ABSTRACT

A rectangular array of signal points forming a QAM signal point constellation is modified by relocating signal points from adjacent corners of the rectangular array to positions extrapolated from the rectangular array and at reduced distances from the origin, corresponding to reduced peak amplitude levels. The location is effected in a manner to maintain, at least for a majority of the relocated points, a Hamming distance of one. To this end for a constellation of $2^{2n+1}$ points, with $n=4$ or more and points with I and Q amplitudes 1, 3, 5 ... units in the rectangular array, a plurality of points in each quandrant are relocated to positions, relative to positions which they would have in the rectangular array, rotated through an angle of 180° about a point having I and Q amplitude co-ordinates of $(2^n, 2^n)$. In addition, in each quadrant each of a plurality of the signal points which are relocated is located in a position, relative to the position which it would have in the rectangular array, in which one of its I and Q amplitude co-ordinates is increased by $2^n$ and the other is reduced by $2^n$. Specific examples are described for 512-QAM ($n=4$).

19 Claims, 4 Drawing Sheets

METHOD OF QUADRATURE-PHASE AMPLITUDE MODULATION

This invention relates to a method of quadrature-phase amplitude modulation, more conveniently referred to as QAM.

BACKGROUND OF THE INVENTION

In QAM, two carrier signals in phase quadrature are amplitude modulated by modulating signals, and are subsequently combined for example for transmission in a microwave radio transmission system. Each transmitted symbol can thus have any one of a relatively large number of phase and amplitude states, which are generally illustrated as signal points in a signal point constellation in a phase plane diagram. Various signal point constellations, of triangular, rectangular, circular, and hexagonal forms and for various numbers of signal points, are described for example in "Digital Amplitude-Phase Keying with M-ary Alphabets" by C. Melvil Thomas et al., presented at the 1972 International Telemetry Conference, Los Angeles, Calif.

For digital transmission of binary data signals, it is convenient for the number of signal points in the signal point constellation to be an integral power of 2. Thus for example 64-QAM transmission systems, in which there are 64 signal points in the constellation so that each transmitted symbol can represent 6 bits ($2^6=64$), are well known. With increasing demands for data transmission, and increasingly more sophisticated techniques, it is desirable to provide higher numbers of signal points in the constellation. Accordingly, 256-QAM transmission systems, in which each transmitted symbol represents 8 bits ($2^8=256$), have been proposed.

It is well known that the signal points should be spaced in the phase plane as far apart as possible to provide the greatest possible signal-to-noise (S/N) ratio, and that the signal points should have the smallest possible amplitudes to minimize the peak power of the transmitted signal. It is also desirable to simplify as far as possible the coding and decoding circuitry required for converting between the signal points in the phase plane and the digital signals which they represent. Particularly in view of this last matter, rectangular signal point constellations, in which the signal points are arranged on a rectangular matrix or grid, have been preferred. Where the number of signal points is an even power of 2, the signal point constellation becomes a square array, for example of 16 by 16 signal points for 256-QAM.

A problem with a square array of 256 signal points is that the points at the corners of the square have relatively large amplitudes, and hence result in a high peak power and a high peak-to-average power ratio for the transmitted signal. In order to reduce this problem, it is known for example from Uchibori et al. U.S. Pat. No. 4,675,619 dated June 23, 1987 and entitled "Multiple Quadrature-Phase Amplitude Modulating System Capable of Reducing a Peak Amplitude" to provide a modified, or stepped, square 256-QAM signal point constellation in which the peak amplitude is reduced, relative to a square constellation, by relocating 6 signal points from each corner of a 16 by 16 point square so that the signal points are arranged in an extrapolated square matrix within a generally circular pattern. While this relocation of signal points results in reduced peak amplitudes, it introduces a further disadvantage, discussed below.

More specifically, Gray coding of digital input signals is generally used so that the digital signal represented by each signal point in the constellation differs from the digital signal represented by any immediately adjacent signal point in only one bit position. Thus a transmitted symbol or signal point which is corrupted and consequently interpreted mistakenly as an adjacent signal point contains only a single bit error. Such a single bit error can be relatively easily detected and corrected using known FEC (forward error correction) coding schemes; for example, a (511,493) BCH code can be used which can correct up to two bits in error in a block of 511 bits, with a resulting increase in the transmitted bit rate of about 3.6%.

However, relocating signal points in the manner discussed above results in 32 of the 256 signal points representing digital signals having 3 bits different from the signal represented by an immediately adjacent signal point; in other words they have a Hamming distance of 3 rather than the preferred Hamming distance of 1. Corruption and consequent misinterpretation of such a signal point results in 3 bits being in error, and this is not correctable using the (511,493) BCH code discussed above.

In order to reduce this and other disadvantages, in Kennard et al. U.S. Pat. No. 4,855,692 issued Aug. 8, 1989 and entitled "Method of Quadrature Phase Modulation", the entire disclosure of which is hereby incorporated herein by reference, there is described and claimed a modified square QAM transmission system in which the relocation of signal points is effected in a manner to minimize the adverse effects of transmission errors.

It is becoming increasingly desirable for microwave radio transmission channels, which have bandwidths of nominally 20, 30, or 40 MHz for the various microwave radio bands at frequencies of the order of 4, 6, and 11 GHz, to accommodate standardized forms of signals for transmission. One of the currently most significant standardized signal forms is SONET, in which signals, referred to as STS-N signals where N is an integer having preferred values of 1, 3, 9, 12, etc., have bit rates of N times 51.84 Mb/s. In particular, a so-called STS-3 SONET signal has a bit rate of 155.52 Mb/s.

Unfortunately, using 256-QAM with FEC, and allowing for necessary channel filter roll-offs, these microwave channel bandwidths provide a poor and inefficient match for the bit rates of SONET signals. For example, a 256-QAM 40 MHz channel provides a transmission rate which is a little less than that required for two STS-3 signals. Accommodating only one STS-3 signal on such a channel would be very inefficient, and accommodating one STS-3 signal together with other, e.g. two STS-1, signals would result in undesired complexity.

In order to avoid this problem, it is desirable to use a modulation scheme which provides a more convenient and efficient matching of microwave radio transmission channels to SONET transmission rates. In particular, a 512-QAM modulation scheme enables this to be done. For example, the use of 512-QAM enables one STS-3 signal to be carried by a 20 MHz channel, and two STS-3 signals to be carried by a 40 MHz channel, in a convenient and relatively efficient manner.

However, the use of 512-QAM means that the techniques discussed above, relating to modifying a square signal point constellation to make it nearly circular, can no longer be used because 512 is an odd, not an even, power of 2.

For QAM signal point constellations with an odd power of 2 points, e.g. with 32 or 128 signal points, it is known to use a + or cross arrangement of the signal points to reduce peak amplitudes. For example, such arrangements are described in the paper by Thomas et al. referred to above, and in a companion paper by J. G. Smith entitled "Odd-Bit Quadrature Amplitude-Shift Keying", presented at the 1974 International Telemetry Conference, Los Angeles, Calif. The latter paper also describes a rectangular block signal point constellation. In either case, however, the peak amplitude for a constellation of 512 signal points is undersirably high.

An object of this invention, therefore, is to provide an improved QAM method in which the above disadvantages are reduced or avoided.

SUMMARY OF THE INVENTION

According to one aspect of this invention there is provided a method of quadrature-phase amplitude modulation comprising the step of amplitude modulating two carrier signal components I and Q in phase quadrature in accordance with signal points in a signal point constellation, the signal point constellation comprising $2^{2n+1}$ signal points, where n is an integer equal to or greater than 4, arranged in a modified rectangular array with substantially $2^{2n-1}$ points in each of four quadrants defined by I and Q axes intersecting at an origin of a phase-plane diagram, the signal points in each quadrant of the array having I and Q component amplitudes of 1, 3, 5, . . . units, the rectangular array being modified by relocating a plurality of points in each quadrant from positions adjacent to a corner of the rectangel to positions extrapolated from the rectangular array and having reduced distances from the origin, wherein in each quadrant each of a majority of the points so relocated is located in a position, relative to the position which it would have in the rectangular array, rotated through an angle of 180° about a point having I and Q amplitude co-ordinates of substantially $(2^n, 2^n)$.

Preferably, in each quadrant each of a plurality of the signal points which are relocated is located in a position, relative to the position which it would have in the rectangular array, in which one of its I and Q amplitude co-ordinates is increased by $2^n$ and the other is reduced by $2^n$.

The relocation of points in each quadrant by rotation and translation in this manner enables the rectangular array to be made approximately circular while maintaining a small Hamming distance between the signal points.

In preferred embodiments of the invention for 512-QAM for which n=4, preferably about 32 signal points are relocated in each quadrant, and said majority of the relocated points whose positions are rotated through 180° comprises about 22 points in each quadrant. In this case said plurality of signal points which are relocated each with one of its I and Q amplitude co-ordinates increased by $2^n$ and the other reduced by $2^n$, i.e. whose positions are translated, comprises at least about 8 signal points in each quadrant.

Advantageously, the relocation of the signal points is effected in such a manner that the signal point constellation is symmetrical about the I and Q axes and about lines passing through the origin at angles of 45° with respect to the I and Q axes.

For a 512-QAM arrangement for which n=4 the greatest distance of any signal point from the origin is desirably not more than about $\sqrt{666}$ units, and may be as little as $\sqrt{650}$ units.

According to another aspect this invention provides a method of quadrature-phase amplitude modulation comprising the step of amplitude modulating two carrier signal components I and Q in phase quadrature in accordance with signal points in a signal point constellation, the signal point constellation comprising 512 signal points arranged in a modified rectangular array with 128 points in each of four quadrants defined by I and Q axes intersecting at an origin of a phase-plane diagram, the signal points in each quadrant of the array having I and Q component amplitudes of 1, 3, 5, . . . units, the rectangular array being modified by relocating 32 points in each quadrant from positions adjacent to a corner of the rectangle to positions extrapolated from the rectangular array and having reduced distances from the origin, wherein in each quadrant: each of about 22 points so relocated is located in a position, relative to the position which it would have in the rectangular array, rotated through an angle of 180° about a point having I and Q amplitude co-ordinates of substantially (16, 16); and each of at least about 8 other points so relocated is located in a position, relative to the position which it would have in the rectangular array, in which one of its I and Q amplitude co-ordinates is increased by 16 units and the other is reduced by 16 units.

In this case preferably two further ones of the points which are so relocated are relocated from positions with co-ordinates (27,1) and (31,5) to positions with co-ordinates (11,23) and (9,21) respectively. The signal point constellation can consequently be symmetrical about the I and Q axes and about lines passing through the origin at angles of 45° with respect to the I and Q axes, with the greatest distance of any signal point from the origin being substantially $\sqrt{650}$ units.

BRIEF DESCRIPTION OF THE DRAWINGS

The invention will be further understood from the following description with reference to the accompanying drawings, in which.

DESCRIPTION OF PRIOR ART

Figure 1:
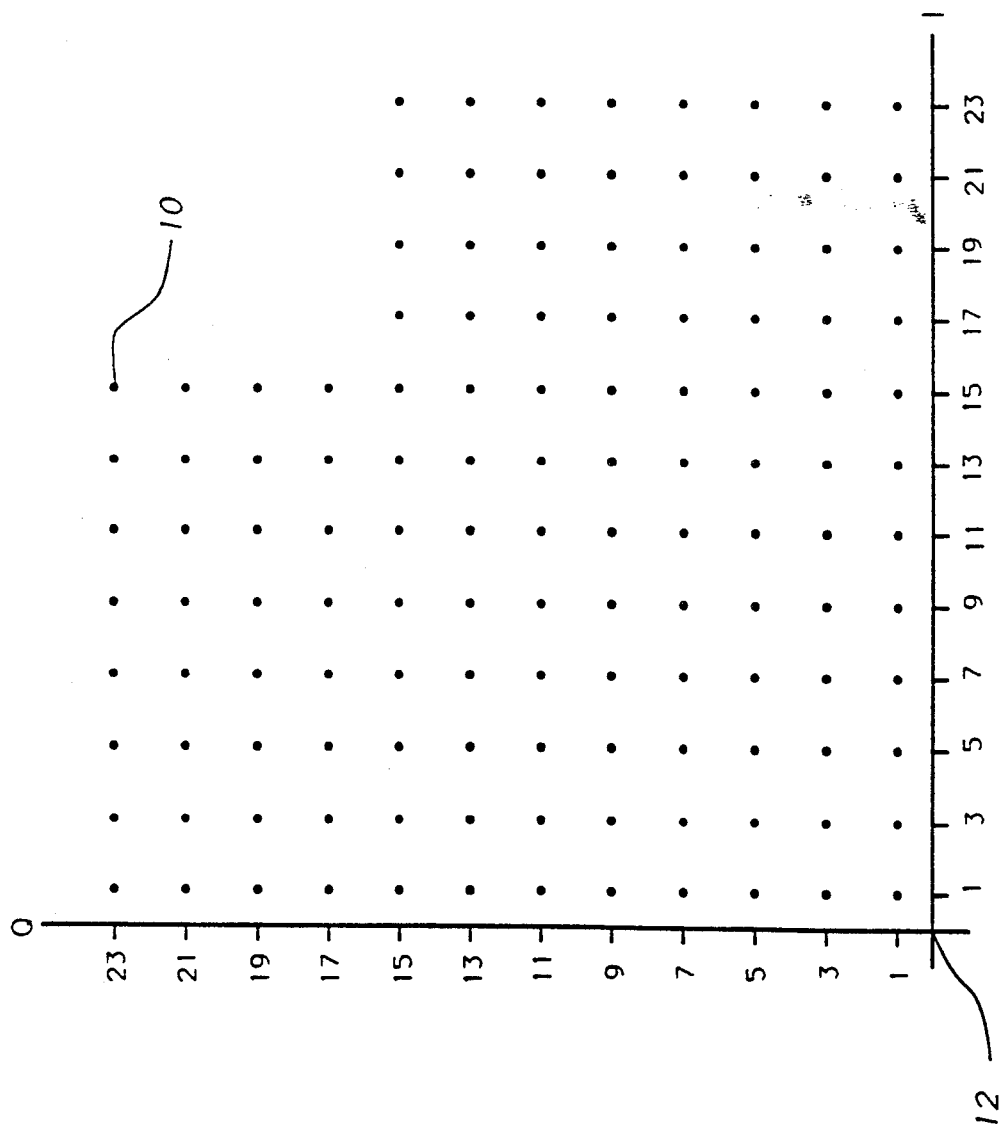
FIG. 1 illustrates a first quadrant of a cross-shaped 512-QAM signal point constellation in accordance with the prior art.

Referring to FIG. 1, the first quadrant of a + or cross-shaped 512-QAM signal point constellation as would be provided in accordance with the prior art is illustrated. The signal points are represented in a phase plane diagram showing the relative amplitudes of phase-quadrature carrier signal components I and Q for each point. The 128 points in this first quadrant are arranged in a rectangular array, with I and Q component amplitudes of 1, 3, 5, . . . 2,3 units. In the other three quadrants there are another 128 points in each quadrant correspondingly arranged but with negative values of the I and/or Q components.

A point such as the point 10 having the I,Q co-ordinates (15,23) has a greatest distance from the origin 12 (intersection of the I and Q axes) of, and correspondingly represents a peak amplitude proportional to, $\sqrt{754}$ units. As has already been explained, it is desirable to reduce this peak power, without adversely affecting the complexity of the coding equipment which must be used or increasing the effects of errors which may occur during signal transmission.

DESCRIPTION OF PREFERRED EMBODIMENT

Figure 2:
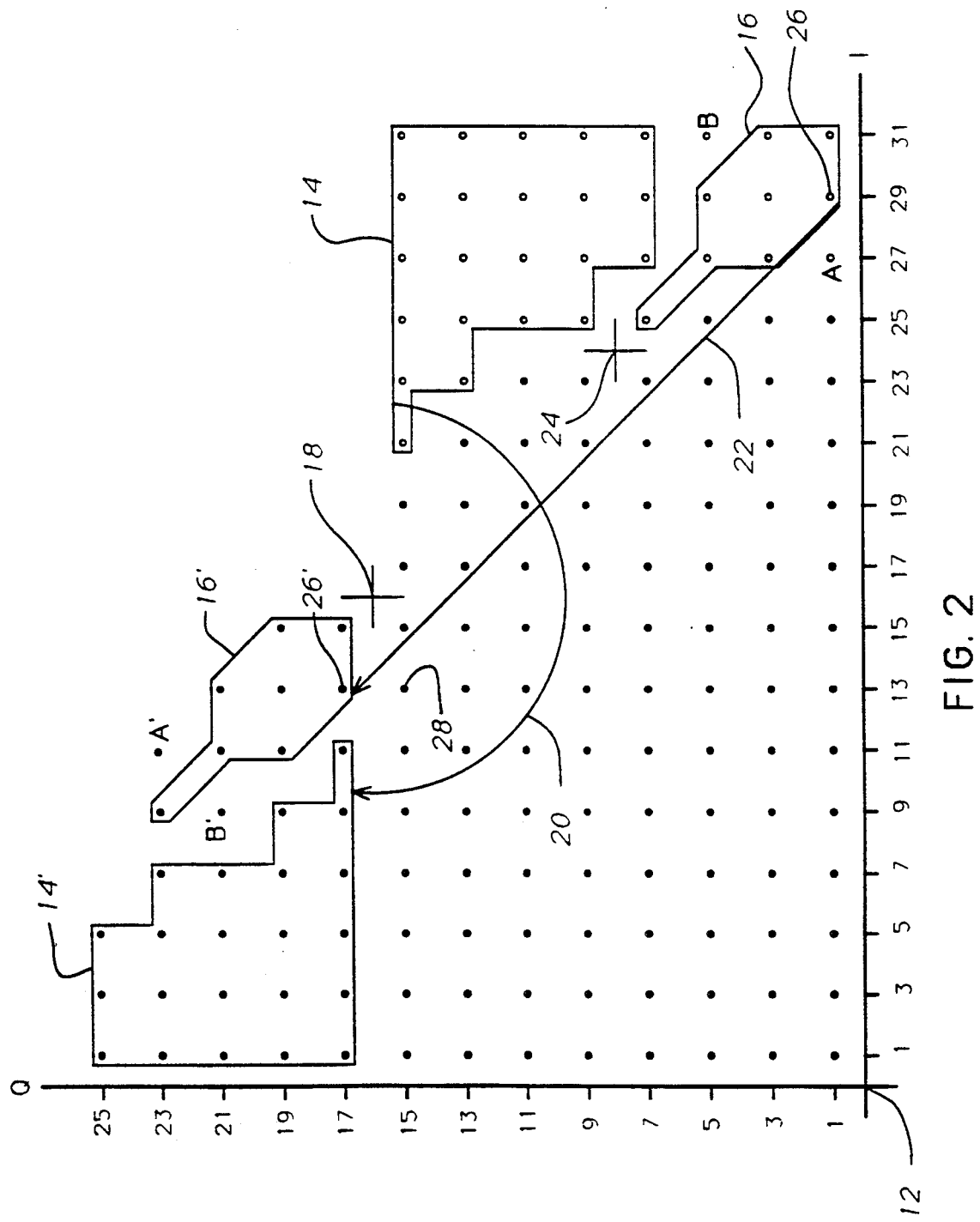
FIGS. 2 and 3 illustrate respectively a first quadrant and all four quadrants of a 512-QAM signal point constellation arranged in accordance with an embodiment of the method of this invention.

Referring now to FIG. 2, there is illustrated a first quadrant of a 512-QAM signal point constellation arranged in accordance with an embodiment of the method of this invention.

In FIG. 2, solid dots represent signal points which are used for transmission, and open dots represent original positions from which some of the transmitted signal point positions are relocated, as described further below. The relocation of signal points is achieved in a similar manner to that described in U.S. Pat. No. 4,675,619, using a code converting unit which may, for example, comprise logic circuitry. As the form of such a code converting unit is known to those of ordinary skill in the art, it need not be described here.

Figure 3:
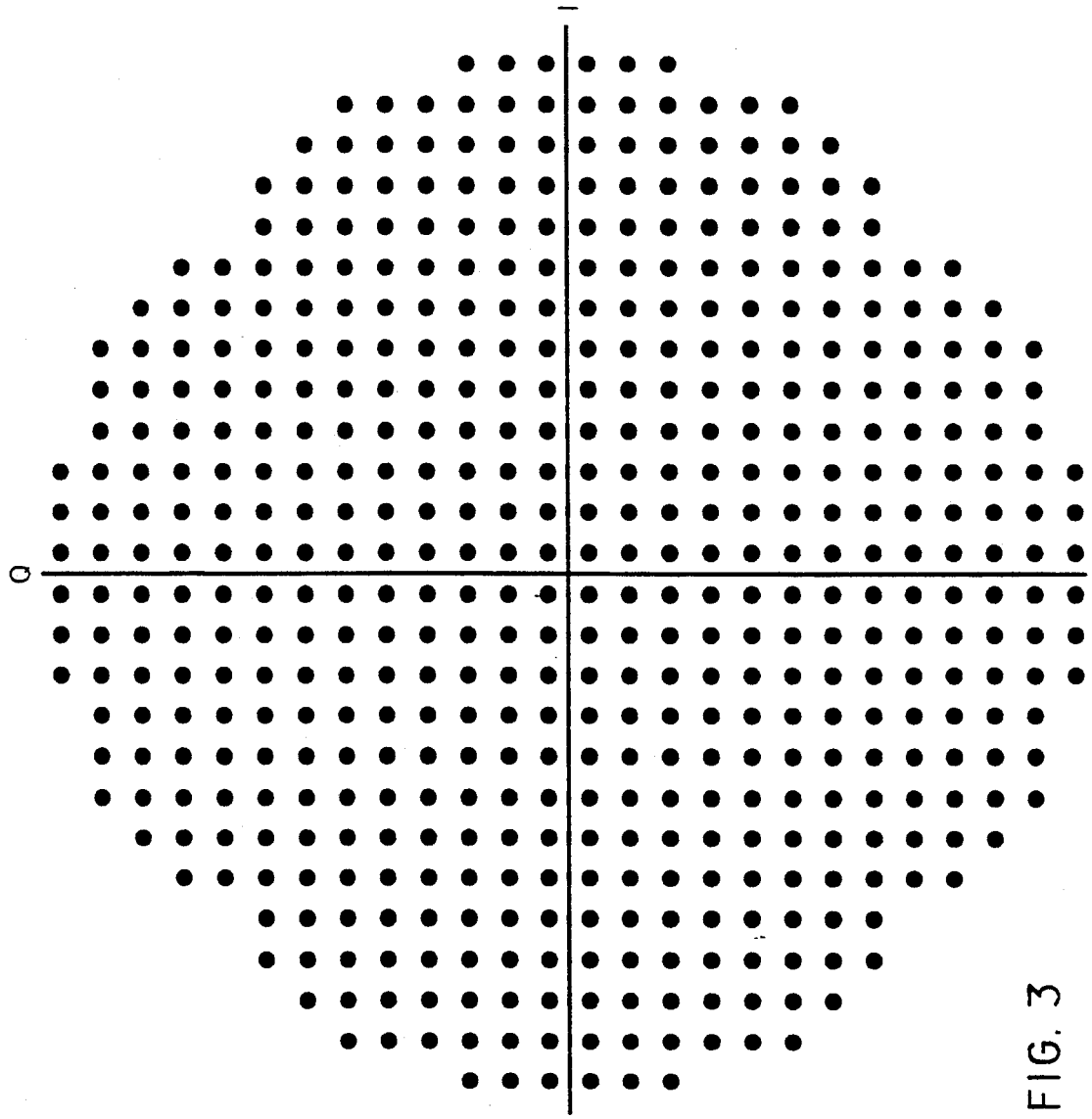

As is known, each transmitted 512-QAM symbol represents 9 bits of a digital signal which is being transmitted ($2^9 = 512$). In the arrangement of FIGS. 2 and 3, 5 of the 9 bits determine and I-component amplitude and the remaining 4 bits determine a Q-component amplitude of the transmitted signal. As shown for only the first quadrant in FIG. 2, this results in a rectangular array of signal points with I-component amplitudes from 1 to 31 and Q-component amplitudes from 1 to 15, assuming a signal point spacing of 2 units in each direction. The 128 signal points in the first quadrant thus comprise 22 points shown within an area 14, 8 points shown within another area 16, and two points referenced A and B, all of which signal points are relocated for transmission as described further below and which are shown as open dots, and 96 points with Q-component amplitudes of 15 or less and I-component amplitudes of 25 or less, which are not relocated and which are shown as solid dots.

The digital signals which are represented by the 512 signal points are Gray coded, so that adjacent signal points differ from one another in only one bit position. In other words, there is a Hamming distance of one between any two adjacent signal points. The relocation of signal points for transmission is effected in a manner to preserve as far as possible this Hamming distance, while at the same time reducing as far as possible the distance of each transmitted signal point from the origin 12, thereby to reduce the peak transmitted power and peak-to-average power ratio.

Accordingly, the 22 points within the area 14 are all relocated by rotation through an angle of 180° about a point 18 having the I,Q co-ordinates (16,16) to corresponding positions within a n area 14', as shown by a semi-circular line 20. This relocation reduces the distance of each point from the origin 12 and preserves the Hamming distance of one for these relocated points.

Furthermore, the 8 points within the area 16 are all relocated by translation, in a direction as shown by a line 22, to corresponding positions within an area 16'; effectively the area 16 is translated through the point 18 to the area 16'. More particularly, each point within the area 16 is translated to a new position within the area 16' by increasing its Q-component amplitude by 16($2^4$) units and decreasing its I-component amplitude by 16 units. Viewed alternatively, the points within the area 16 can be regarded as being relocated by two consecutive rotations each through 180° about a respective point. The first such rotation is about a point 24 having the I,Q co-ordinates (24,8), and the second such rotation is about the point 18 (or the first rotation can be considered to be about the point 18, and the second rotation being about a point with the I,Q co-ordinates (8,24)).

The above-described relocation of the 8 points within the area 16 again reduces the distances of these signal points from the origin 12, whilst to a large extent maintaining the Hamming distance of one for these points. More particularly, the Hamming distance of one is maintained among the translated points, and is only increased in respect of points at boundaries of the translated set of points.

For example, consider a point 26 having the (I,Q) co-ordinates (29,1). This is relocated for transmission, by the code converting unit, to a point 26' having the co-ordinates (13,17). Due to an error, this may be wrongly interpreted at a receiver as being an adjacent point 28 having the co-ordinates (13,15). The points 26' and 28 are on different sides of a boundary between points which are relocated and other points which are not relocated. The original point 26 has the 9-bit Gray code value 10001,1000 for the I,Q components respectively. The incorrectly interpreted point 28 has the 9-bit Gray code value 11101,1100, which has 2 bits in error for the I component and 1 bit in error for the Q component. These incorrect bits are corrected using FEC coding applied individually to each of the 9 bit lines supplying the code converting unit in the transmission system modulator, with corresponding FEC decoding in the 9 bit lines leading from the code converting unit in the receiver's demodulator.

The two further points referenced A and B are relocated to the respective positions A' and B', which are selected to provide an optimum relocation of these points especially in respect of their distances from the origin 12. More particularly, the point A at the co-ordinates (27,1) is relocated to the point A' at the co-ordinates (11,23), and the point B at the co-ordinates (31,5) is relocated to the point B' at the co-ordinates (9,21). Alternatives for these points are discussed further below.

With the relocated signal points as shown by solid dots in FIG. 2, the greatest distance of any point from the origin 12 is $\sqrt{650}$ units, which is considerably less than the $\sqrt{754}$ figure for the cross constellation of FIG. 1, with a corresponding decrease in peak power required of the transmission system. At the same time, the relocation of points is effected in a manner which maintains a small Hamming distance between adjacent signal points, whereby errors can be largely eliminated by using appropriate error correcting codes.

It is important to note the practical and commercial significance of the peak power reduction which is achieved in this embodiment of the invention. Relative to the $\sqrt{650}$ peak figure provided as described above, the prior art figure of $\sqrt{754}$ corresponds to an increased peak power requirement for the transmitter of 10 log(754/650)dB, or about 0.65 dB. At a typical incremental cost of the order of $1,000 per dB of transmitter peak power, the decreased peak power provided by this invention enables a substantial saving in costs.

FIG. 3 illustrates the overall signal point constellation which results from the relocation of points as described with reference to FIG. 2 being applied to all four quadrants of an initially rectangular block of 512 points. The relocation is applied symmetrically in the four quadrants, whereby the resulting constellation has both quadrant symmetry and symmetry with respect to 45° phase angle would be represented in the drawings by lines at 45° with respect to the I and Q axes, for example a line passing through the points 12 and 18 in FIG. 2. This 45° phase angle symmetry is a significant advantage in practice, in that the modulation scheme is consequently "well-behaved" at times before carrier recovery is established, when frequency errors produce resulting phase changes having the effect of the signal point constellation rotating about the I and Q axes.

As mentioned above, alternatives exist for relocating the points A and B. While these alternatives still provide a reduction in peak power in relation to the cross constellation of the prior art, they require greater peak powers than the embodiment of the invention described above with reference to FIGS. 2 and 3 and are less preferred for this reason.

One of these alternatives is not to relocate the point A but to leave it in its original position, and to relocate the point B as one of the points in the area 14, so that it is moved to the I,Q co-ordinates (1,27). The point A and the relocated point B would then have the greatest distance from the origin of $\sqrt{730}$ units. In this case, it would be less necessary to relocate other points which are at positions closer than this to the origin, such as the points with the I,Q co-ordinates (21,15), (23,13), and (25,7).

Figure 4:
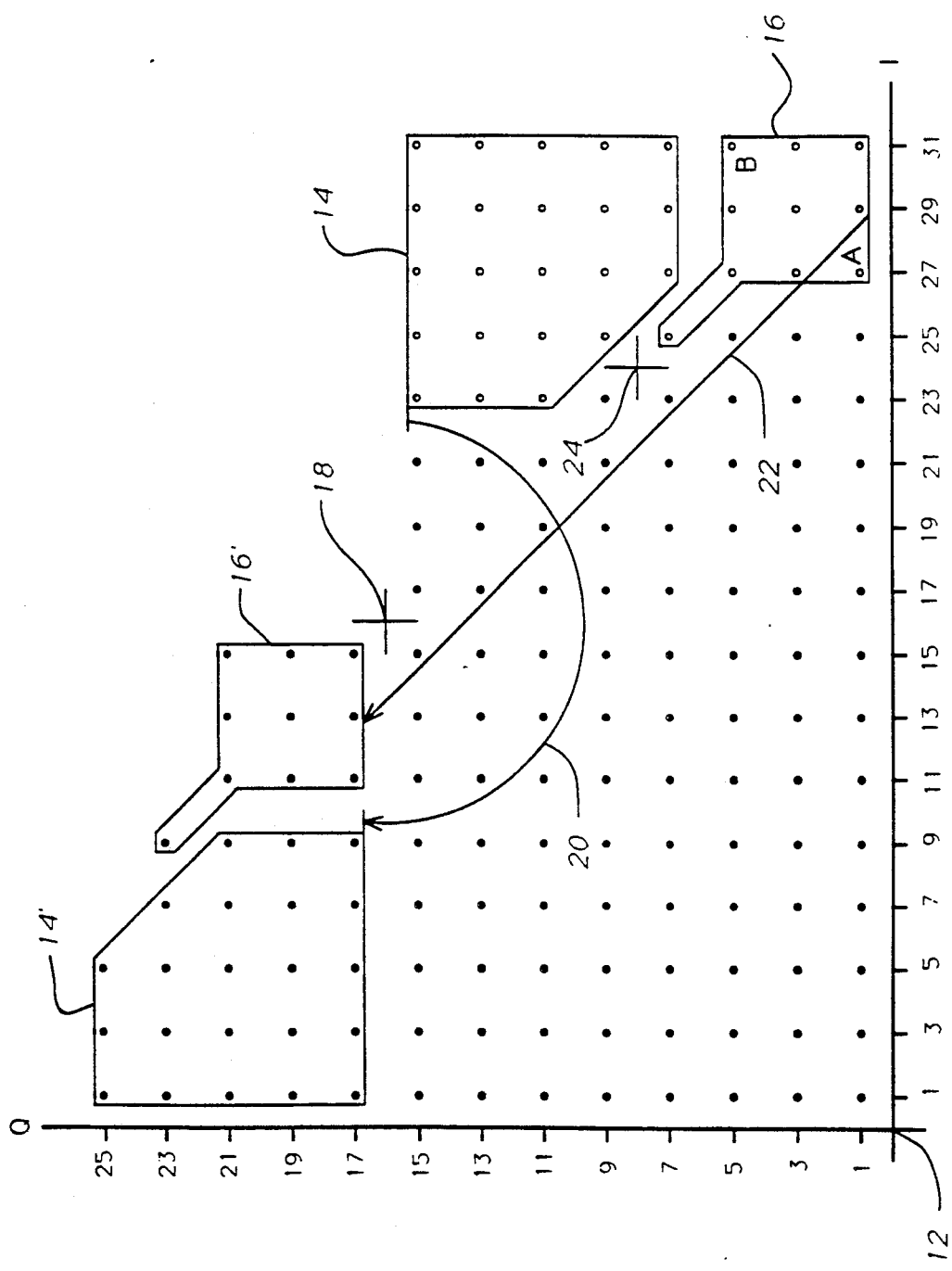
FIG. 4 illustrates a first quadrant of an alternative 512-QAM signal point constellation arranged in accordance with an embodiment of the method of this invention.

A further alternative is to modify the relocation of points to be as shown in FIG. 4. In FIG. 4, the areas 14 and 16 are modified so that the points A and B can both be included within the area 16; the point at the I,Q co-ordinates (21,15) is consequently omitted from the area 14 and is not relocated. This point now defines the greatest distance from the origin, which in this case is $\sqrt{666}$ units. The point at the I,Q co-ordinates (23,11) is in this case included within the area 14 and is moved accordingly, so that the resulting signal point constellation is symmetrical about the I and Q axes and about 45° lines or phase angles with respect thereto.

Other alternative relocations of points may be effected along similar lines to those described above, as deemed appropriate in particular circumstances.

The signal point constellations described above provide 512 points, for 512-QAM. The invention may be similarly applied to higher numbers of points which are odd powers of 2, for example for 2048-QAM.

Although in the above description reference is made to relocating points by translating them or rotating them through 180°, it should be appreciated that this is to provide a full understanding and appreciation of the invention and that in carrying out the invention there need be no actual movement of any signal point. In other words, the rectangular arrays of points would not themselves be produced, but rather the points of the signal point constellations of FIGS. 2 to 4 would be produced directly from digital input signals, for example using a PROM (programmable read-only memory). Thus for example for the 512-QAM signal point constellations a PROM having 512 storage locations each for the I and Q component values (5 bits each) of a respective signal point of the constellation could be addressed with a 9-bit digital input signal to read out directly the respective I and Q component values.

Although particular embodiments of the invention have been described in detail, it should be appreciated that numerous modifications, variations, and adaptations may be made thereto without departing from the scope of the invention as defined in the claims.

What is claimed is:

1. A method of quadrature-phase amplitude modulation comprising the step of amplitude modulating two carrier signal components I and Q in phase quadrature in accordance with signal points in a signal point constellation, the signal point constellation comprising $2^{2n+1}$ signal points, where n is an integer equal to or greater than 4, arranged in a modified rectangular array with substantially $2^{2n-1}$ points in each of four quadrants defined by I and Q axes intersecting at an origin of a phase-plane diagram, the signal points in each quadrant of the array having I and Q component amplitudes of 1,3,5, ... units, the rectangular array being modified by relocating a plurality of points in each quadrant from positions adjacent to a corner of the rectangle to positions extrapolated from the rectangular array and having reduced distances from the origin, wherein in each quadrant each of a majority of the points so relocated is located in a position, relative to the position which it would have in the rectangular array, rotated through an angle of 180° about a point having I and Q amplitude co-ordinates of substantially $(2^n, 2^n)$.

2. A method as claimed in claim 1 wherein in each quadrant each of a plurality of the signal points which are relocated is located in a position, relative to the position which it would have in the rectangular array, in which one of its I and Q amplitude co-ordinates is increased by $2^n$ and the other is reduced by $2^n$.

3. A method as claimed in claim 2 wherein n=4.

4. A method as claimed in claim 3 wherein 32 signal points are relocated in each quadrant.

5. A method as claimed in claim 4 wherein said majority of the relocated points comprises 22 points each quadrant.

6. A method as claimed in claim 5 wherein said plurality of signal points which are relocated each with one of its I and Q amplitude co-ordinates increased by $2^n$ and the other reduced by $2^n$ comprises 8 signal points in each quadrant.

7. A method as claimed in claim 1 wherein the signal point constellation is symmetrical about the I and Q axes and about lines passing through the origin at angles of 45° with respect to the I and Q axes.

8. A method as claimed in claim 2 wherein the signal point constellation is symmetrical about the I and Q axes and about lines passing through the origin at angles of 45° with respect to the I and Q axes.

9. A method as claimed in claim 6 wherein the signal point constellation is symmetrical about the I and Q axes and about lines passing through the origin at angles of 45° with respect to the I and Q axes.

10. A method as claimed in claim 8 wherein n=4 and the greatest distance of any signal point from the origin is not more than about $\sqrt{666}$ units.

11. A method as claimed in claim 9 wherein the greatest distance of any signal point from the origin is not more than about $\sqrt{666}$ units.

12. A method as claimed in claim 8 wherein n=4 and the greatest distance of any signal point from the origin is substantially $\sqrt{650}$ units.

13. A method as claimed in claim 9 wherein the greatest distance of any signal point from the origin is substantially $\sqrt{650}$ units.

14. A method of quadrature-phase amplitude modulation comprising the step of amplitude modulating two carrier signal components I and Q in phase quadrature in accordance with signal points in a signal point constellation, the signal point constellation comprising 512 signal points arranged in a modified rectangular array with 128 points in each of four quadrants defined by I and Q axes intersecting at an origin of a phase-plane diagram, the signal points in each quadrant of the array having I and Q component amplitudes of 1, 3, 5, . . . units, the rectangular array being modified by relocating 32 points in each quadrant from positions adjacent to a corner of the rectangle to positions extrapolated from the rectangular array and having reduced distances from the origin, wherein in each quadrant:

each of about 22 points so relocated is located in a position, relative to the position which it would have in the rectangular array, rotated through an angle of 180° about a point having I and Q amplitude co-ordinates of substantially (16,16); and each of at least about 8 other points so relocated is located in a position, relative to the position which it would have in the rectangular array, in which one of its I and Q amplitude co-ordinates is increased by 16 units and the other is reduced by 16 units.

15. A method as claimed in claim 14 wherein the signal point constellation is symmetrical about the I and Q axes and about lines passing through the origin at angles of 45° with respect to the I and Q axes.

16. A method as claimed in claim 15 wherein the greatest distance of any signal point from the origin is substantially $\sqrt{650}$ units.

17. A method as claimed in claim 16 wherein two further ones of the points which are so relocated are relocated from positions with co-ordinates (27,1) and (31,5) to positions with co-ordinates (11,23) and (9,21) respectively.

18. A method as claimed in claim 14 wherein the greatest distance of any signal point from the origin is substantially $\sqrt{650}$ units.

19. A method as claimed in claim 14 wherein the greatest distance of any signal point from the origin is not more than about $\sqrt{666}$ units.

* * * * *